July 17, 1951  H. SEBEL  2,560,704
COMBINATION WHEEL MOUNTING AND UNIDIRECTIONAL
ROTATION CONTROL MEANS
Filed March 1, 1948
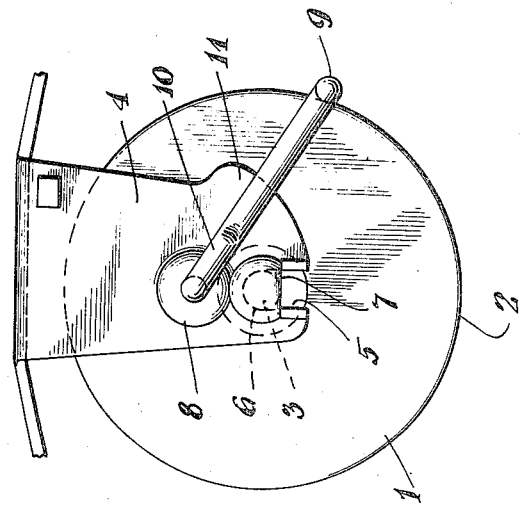
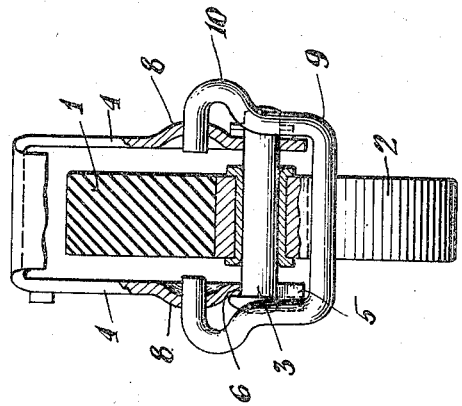
INVENTOR
Harry Sebel
BY
ATTORNEYS Patented July 17, 1951

2,560,704

UNITED STATES PATENT OFFICE 2,560,704

COMBINATION WHEEL MOUNTING AND UNIDIRECTIONAL ROTATION CONTROL MEANS

Harry Sebel, London, England

Application March 1, 1948, Serial No. 12,407
In Great Britain August 25, 1943

2 Claims. (Cl. 188—30)

The present invention relates to a simple device for attachment to wheels or other rotary or stationary circular members to provide an action analogous to a pawl and ratchet mechanism.

When it is desired to provide a rotatable wheel with uni-directional rotation it is usual to provide the wheel with a pawl and ratchet mechanism which necessitates structural alterations to the wheel or the provision of a special ratchet wheel. This adds considerably to the cost of such wheels and, furthermore, these wheels are then permanently unidirectional and cannot easily be converted for rotation freely in both directions. Furthermore, the pawl and ratchet mechanism adds considerably to the weight of the wheel which is frequently undesirable as unsprung weight.

An object of the present invention is to provide a device which may be attached to existing wheels as well as incorporated into wheels having normal rims or tyres which provide all the benefits of a pawl and ratchet mechanism and which, in addition, may, when desired, free the wheel for rotation in both directions and also provide a noiseless action as against the common clicking of the known pawl and ratchet devices.

The present invention is characterised broadly by the provision of a devise for attachment to wheels or to other circular members having normally smooth rims or tyres, said device comprising a pivoted member adapted to pivot in or parallel to the plane of the wheel or other circular member and provided with a binding portion which is adapted to engage the rim or tyre of the wheel or other circular member so that a binding action is obtained on the rim or tyre of the wheel or other circular member to stop rotation of the wheel or circular member. The pivoted member is mounted so that the line between the point of contact of the binding portion and the pivot point of the pivoted member lies along a chord of the wheel or other circular member.

The invention will now be described with reference to the accompanying drawings, in which Figure 1 shows a construction in accordance with the present invention in side elevation; and Figure 2 shows an end elevation of Figure 1 with a part broken away in section.

A wheel 1 having a smooth periphery 2 is mounted upon an axle pin 3 carried in a wheel fork 4 in normal manner. A slot 5 is provided in one leg of the fork 4 by cutting the material from the aperture 6 to the lower edge of the fork and turning the material outwards. This forms two shoulders upon which a flat 7 cut on the head of the axle pin rests and serves to prevent the axle pin rotating.

Vertically above the axle pin and below the periphery of the wheel 1 the legs of the bracket are bossed out at 8 and apertured. These apertures receive the ends of a U-shaped member or bail 9. This member has bowed portions 10 which are turned into the straight to lie parallel with the wheel before passing beyond the edge of the legs of the fork. For this purpose the legs may be extended in area in this direction as at 11. The base of the U member 9 is turned across the wheel periphery so as to bear against the wheel edge.

The bossing 8 allows a greater margin for the ends of the member 9 without danger of the ends either springing out of the holes or fouling the wheel 1. The bowed portion 10 enables the ends of the member 9 to enter cleanly into the holes in the bosses in a truly axial direction and by fetching the bowed portion back into the straight with only a slight clearance of the legs the lateral movement of the U member 9 is so limited that the ends of the member 9 are prevented from leaving the holes in the bossing 8.

The wheel periphery is preferably of rubber or other yieldable material which will enhance the binding effect of the member 9 on the wheel.

If desired a clip 12 may be provided upon the wheel fork or elsewhere for holding the member 9 so that when it is desired to allow the wheel free rotation in either direction the member 9 may be held out of engagement with the wheel.

In operation the wheel is free to rotate in the direction in which it tends to lift the member 9 off the wheel but binds against the wheel in the opposite direction of rotation and effectively stops the wheel from rotating. In this operation the member 9 is subjected to a stretching and without the bowed portions 10 the ends tend to spring out of the bossing 8. Any side thrust imparted to the member 9 is taken by the straight portion of the member 9 bearing against the legs 4.

What I claim is:

1. Combination wheel mounting and uni-directional rotation control means comprising a wheel supporting bracket having laterally spaced legs, said legs having spaced upper and lower pairs of aligned apertures, an axle pin extending through the lower pair of apertures, a wheel on said axle pin, a generally U-shaped bail having opposed inturned end portions pivoted in said upper pair of apertures, an outer cross portion biased by gravity to engage and ride freely upon the periphery of the wheel when the latter is rotated in one direction and binding on the wheel periphery to resist rotation thereof when it is rotated in the opposite direction, said bail also having outwardly bowed arms connecting said cross portion to said end portions, said bowed arms being effective to permit yieldable movement of the cross portion away from the end portions when the bail is subject to tension during a binding action of said cross portion.

2. Combination wheel mounting and uni-directional rotation control means as claimed in claim 1, in which said legs have generally flat outer surfaces, in which portions only of said bail arms are outwardly bowed, and in which said bail arms also have straight portions lying closely adjacent and parallel to said flat outer surfaces of the bracket legs and effective to prevent lateral shifting of the bail sufficient to unseat the end portions thereof.

HARRY SEBEL.

REFERENCES CITED

The following references are of record in the file of this patent:

UNITED STATES PATENTS

| Number | Name | Date |
| --- | --- | --- |
| 1,476,439 | Boatsman | Dec. 4, 1923 |
| 1,700,109 | Roe | Jan. 22, 1929 |
| 1,763,183 | Roe | June 10, 1930 |
| 1,800,587 | Appleby | Apr. 14, 1931 |
| 2,216,418 | McNally | Oct. 1, 1940 |